United States Patent [19]

DeMartino et al.

[11] Patent Number: 4,808,332
[45] Date of Patent: Feb. 28, 1989

[54] ACRYLIC COPOLYMERS EXHIBITING NONLINEAR OPTICAL RESPONSE

[75] Inventors: Ronald N. DeMartino, Wayne; Hyun-Nam Yoon, New Providence, both of N.J.

[73] Assignee: Hoechst Celanese Corp., Somerville, N.J.

[21] Appl. No.: 106,301

[22] Filed: Oct. 9, 1987

[51] Int. Cl.$^4$ .................. C08F 20/70; C08F 261/06; C09K 19/52
[52] U.S. Cl. .................. 526/312; 252/299.01
[58] Field of Search .................. 252/299.01, 299.67, 252/299.68, 299.7; 526/311

[56] References Cited

U.S. PATENT DOCUMENTS

| | | | |
|---|---|---|---|
| 4,293,435 | 10/1981 | Portugall et al. | 252/299.01 |
| 4,631,328 | 12/1986 | Ringsdorf et al. | 526/312 |
| 4,757,130 | 7/1988 | De Martino | 252/299.01 |
| 4,762,912 | 8/1988 | Leslie et al. | 526/311 |

*Primary Examiner*—Theodore Morris
*Attorney, Agent, or Firm*—Depaoli & O'Brien

[57] ABSTRACT

This invention provides novel isotropic acrylic copolymers which exhibit nonlinear optical response, and which have utility as a transparent optical component in optical light switch and light modulator devices.

An invention isotropic acrylic copolymer is illustrated by the following structure:

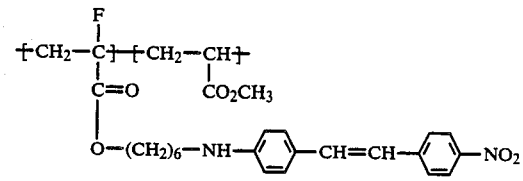

11 Claims, No Drawings

ACRYLIC COPOLYMERS EXHIBITING NONLINEAR OPTICAL RESPONSE

This invention was made with Government support under Contract Number F49620-86-C-0129 awarded by the Department of Defense. The Federal Government has certain rights in this invention.

CROSS-REFERENCES TO RELATED APPLICATIONS

The subject matter of this patent application is related to that disclosed in patent application Ser. No. 915,179, filed Oct. 3, 1986, which is incorporated herein by reference; patent application Ser. No. 121,302, filed Nov. 10, 1987; and patent application Ser. No. 120,253 filed Nov. 10, 1987.

BACKGROUND OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above recited publications are incorporated herein by reference.

Of more specific interest with respect to the present invention embodiments is prior art relating to polymers with comb-like side chains. Eur. Polym. J., 18, 651(1982) describes liquid crystalline polymers of the smectic and nematic types with cyanobiphenyl groups in the side chain:

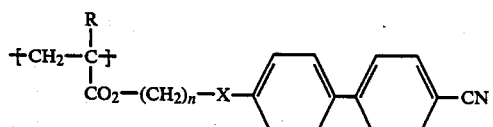

where R is hydrogen or methyl, n is an integer of 2–11, and X is an oxy, alkylene or carbonyloxy divalent radical.

SPIE Vol. 682, pages 56–64, Molecular and Polymeric Optoelectronic Materials: Fundamentals and Applications (presented at Aug. 21–22, 1986 meeting) describes liquid crystalline polymeric systems which are copolymers of a mesogenic monomer and a nonlinear optically responsive monomer.

A disadvantage of liquid crystalline polymers which exhibit mesogenic side chain nonlinear optical response is an observed light scattering effect when the polymer is in the form of a solid phase optical medium, e.g., the polymer medium exhibits more than about 20 percent scattering of transmitted incident light. The light scattering is due to deviations from ideal molecular order which accommodate defects that are not optically clear.

There is continuing interest in the theory and practice of polymers which are characterized by comb-like side chain structures which can be oriented in an applied external field.

There is also an increasing research effort to develop new nonlinear optical organic systems for prospective novel phenomena and devices adapted for laser frequency conversion, information control in optical circuitry, light valves and optical switches. The potential utility of organic materials with large second order and third order nonlinearities for very high frequency application contrasts with bandwidth limitations of conventional inorganic electrooptic materials.

Accordingly, it is an object of this invention to provide novel polymers with comb-like side chains.

It is another object of this invention to provide acrylic copolymers having side chains which exhibit nonlinear optical response.

It is a further object of this invention to provide optical light switch and light modulator devices with a transparent polymeric nonlinear optical component comprising an isotropic acrylic copolymer.

Other objects and advantages of the present invention shall become apparent from the accompanying description and examples.

DESCRIPTION OF THE INVENTION

One or more objects of the present invention are accomplished by the provision of an isotropic acrylic copolymer which is characterized by recurring monomeric units corresponding to the formula:

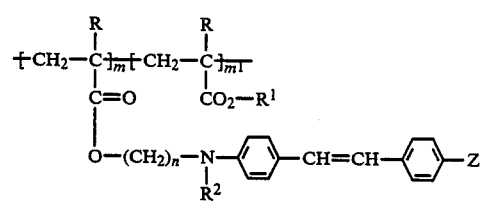

where m and $m^1$ are integers which total at least 10, and the m monomer comprises between about 10–90 mole percent of the total $m+m^1$ monomer units; R is hydrogen or a $C_1$–$C_4$ alkyl, $C_6$–$C_{10}$ aryl, halo or haloalkyl substituent; n is an integer between about 1–12; $R^1$ is a $C_1$–$C_6$ alkyl substituent; $R^2$ is hydrogen or a $C_1$–$C_4$ alkyl substituent; and Z is a nitro or cyano substituent.

In another embodiment this invention provides a transparent nonlinear optical medium comprising an isotropic acrylic copolymer having a structure as represented in the above formula.

In another embodiment this invention provides a transparent nonlinear optical medium comprising an acrylic copolymer having a structure as represented in the above formula, and being further characterized by an external field-induced orientation of aligned m monomer side chains.

In another embodiment this invention provides an isotropic acrylic copolymer which is characterized by recurring monomeric units corresponding to the formula:

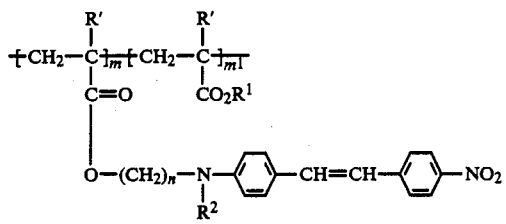

where m and $m^1$ are integers which total at least 20, and the m monomer comprises between about 20–80 mole percent of the total $m+m^1$ monomer units; R' is hydrogen or a methyl substituent; n is an integer between about 1-12; $R^1$ is a $C_1$–$C_6$ alkyl substituent; and $R^2$ is hydrogen or a $C_1$–$C_4$ alkyl substituent.

In another embodiment this invention provides an isotropic acrylic copolymer which is characterized by recurring monomeric units corresponding to the formula:

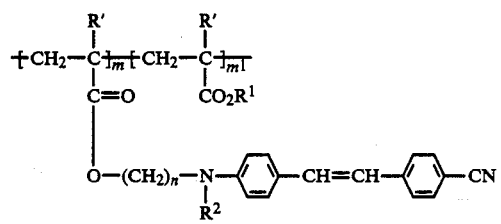

where m and $m^1$ are integers which total at least 20, and the m monomer comprises between about 20–80 mole percent of the total $m+m^1$ monomer units; R' is hydrogen or a methyl substituent; n is an integer between about 1-12; $R^1$ is a $C_1$–$C_6$ alkyl substituent; and $R^2$ is hydrogen or a $C_1$–$C_4$ alkyl substituent.

In a further embodiment this invention provides an optical light switch or light modulator device with a polymeric nonlinear optical component comprising a transparent solid medium of an isotropic acrylic copolymer which is characterized by recurring monomeric units corresponding to the formula:

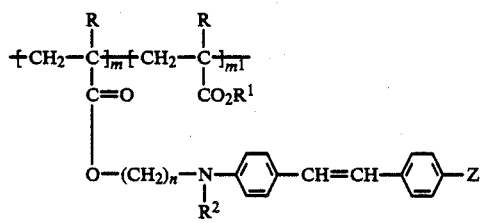

where m and $m^1$ are integers which total at least 10, and the m monomer comprises between about 10–90 mole percent of the total $m+m^1$ monomer units; R is hydrogen or a $C_1$–$C_4$ alkyl, $C_6$–$C_{10}$ aryl, halo or haloalkyl substituent; n is an integer between about 1-12; $R^1$ is a $C_1$–$C_6$ alkyl substituent; $R^2$ is hydrogen or a $C_1$–$C_4$ alkyl substituent; and Z is a nitro or cyano substituent.

Illustrative of $C_1$–$C_4$ and $C_1$–$C_6$ alkyl substituents in the above defined polymer formulae are methyl, ethyl, propyl, isopropyl, butyl, isobutyl, pentyl, hexyl, 2-hexyl, and the like.

Illustrative of $C_6$–$C_{10}$ aryl substituents are phenyl, tolyl, xylyl, methoxyphenyl, chlorophenyl, naphthyl, and the like.

Illustrative of halo and haloalkyl substituents are chloro, bromo, fluoro, trifluoromethyl, and the like.

A present invention isotropic acrylic copolymer can contain other vinyl comonomeric units in addition to the acrylate units. Illustrative of copolymerizable vinyl monomers are vinyl halide, vinyl carboxylate, acrylonitrile, methacrylonitrile, alkene, arylvinyl, and the like. Suitable vinyl monomers include vinyl chloride, vinyl acetate, ethylene, propylene, isobutylene, isoprene and styrene.

The additional vinyl comonomer or comonomers can be incorporated in a proportion up to about 30 mole percent of a present invention isotropic acrylic copolymer.

A present invention isotropic acrylic copolymer normally has a glass transition temperature in the range between about 40°–180° C., and a weight average molecular weight in the range between about 5000–200,000.

A present invention isotropic acrylic copolymer has a glass-like appearance which is optically transparent in both solid and melt phases. An invention copolymer is tractable, and the relatively low viscosity of the melt phase facilitates induced orientation of the copolymer side chains by means of an external field.

The term "isotropic" as employed herein refers to an acrylic copolymer which in the form of a transparent medium exhibits optical properties which are equivalent in all tensor directions.

The term "transparent" as employed herein refers to an optical medium which is transparent or light transmitting with respect to incident fundamental light frequencies and created light frequencies. In a nonlinear optical device, a present invention polymeric nonlinear optical component is transparent to both the incident and exit light frequencies, and the polymeric nonlinear optical component exhibits less than about 5 percent scattering of transmitted incident light.

A present invention optical light switch or light modulator device typically will have a polymeric nonlinear optical component which is a transparent solid medium of an isotropic acrylic copolymer having a stable orientation of an external field-induced alignment of pendant side chains.

Illustrative of a present invention optical device containing a polymeric nonlinear optical component as defined above is a laser frequency converter, an optical Pockels effect device, an optical Kerr effect device, a degenerate four wave mixing device, an optical interferometric waveguide gate, a wide-band electrooptical guided wave analog-to-digital converter, an all-optical multiplexer, an all-optical demultiplexer, an optical bistable device, or an optical parametric device.

Optical harmonic generating devices are described in Science, 216(1982); and in U.S. Pat. Nos. 3,234,475; 3,395,329; 3,694,055; 3,858,124; and 4,536,450.

Optical Kerr effect devices are described in U.S. Pat. Nos. 4,428,873 and 4,515,429; and references cited therein.

Degenerate four wave mixing optical devices are discussed by Y. R. Shen in Chapter 15, "The Principles of Nonlinear Optics"; John Wiley & Sons, New York (1984). A nonresonant degenerate four wave mixing mirror device is described by J. Feinberg et al in Optics Letters, 5(12), 519(1980).

An optical interferometric waveguide gate device is described by A. Lattes et al in IEEE J. Quantum Electron, QE-19(11), 1718(1983).

A wide-band electrooptical guided-wave analog-to-digital converter device is described by R. A. Becker et al in Proceedings of the IEEE, 72(7), 802(1984).

Optical multiplexer-demultiplexer devices are described in U.S. Pat. Nos. 3,532,890; 3,755,676; 4,427,895; 4,455,643; and 4,468,776.

Optical bistable devices are described in U.S. Pat. Nos. 4,515,429 and 4,583,818; and by P. W. Smith et al in Applied Physics Letters, 30(6), 280(1977), and in IEEE Spectrum, June 1981.

Optical parametric devices are described in U.S. Pat. Nos. 3,371,220; 3,530,301; and 3,537,020.

A present invention optical device can be provided by constructing an optical device of the type described in the technical literature, except that a novel isotropic acrylic copolymer as defined herein is utilized as the nonlinear optical component.

SYNTHESIS OF ISOTROPIC ACRYLIC COPOLYMERS

The preparation of isotropic acrylic copolymers with nonlinear optically responsive side chains is illustrated by the following flow diagram:

to the polarization induced in an atom or molecule by an external field.

As summarized in the ACS Symposium Series 233(1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in an isotropic domain:

$$\Delta\mu = \mu_e - \mu_g = \alpha E + \beta EE + \gamma EEE + \ldots \quad (1)$$

$$P = P_0 + \chi^{(1)}E + \chi^{(2)}EE + \chi^{(3)}EEE + \ldots \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave. Birefringent

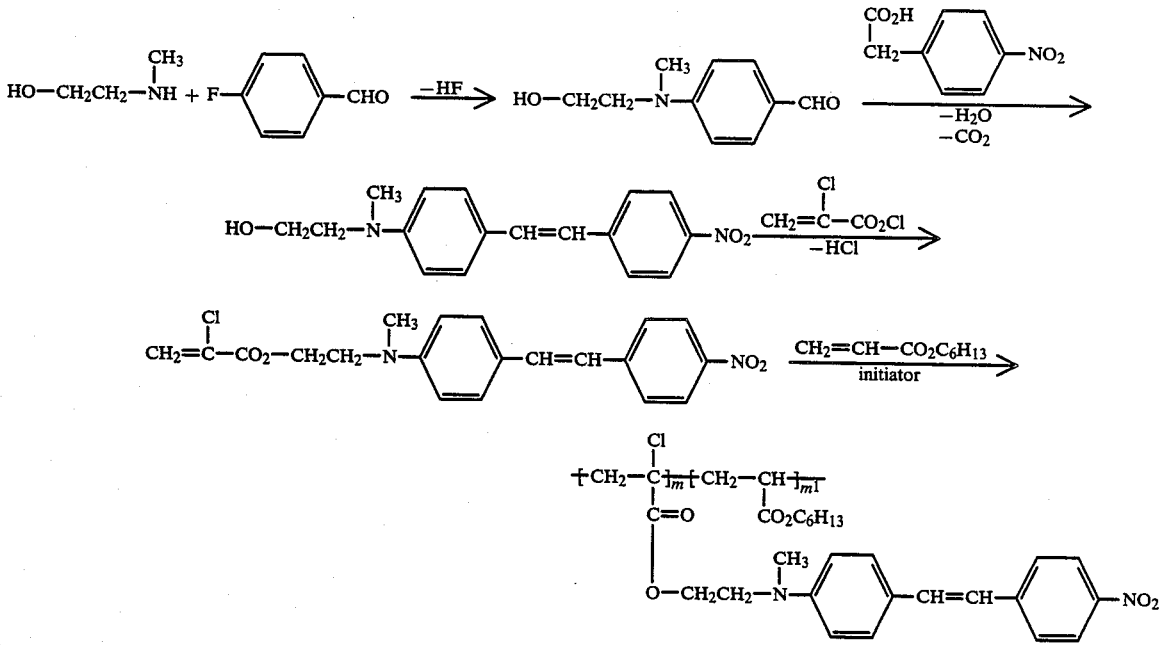

NONLINEAR OPTICAL PROPERTIES

The fundamental concepts of nonlinear optics and their relationship to chemical structures can be expressed in terms of dipolar approximation with respect crystals often possess propagation directions in which the refractive index for the fundamental $\omega$ and the second harmonic $2\omega$ are identical so that dispersion may be overcome.

The term "phase matching" as employed herein refers to an effect in a nonlinear optical medium in which a harmonic wave is propagated with the same effective refractive index as the incident fundamental light wave. Efficient second harmonic generation requires a nonlinear optical medium to possess propagation directions in which optical medium birefringence cancels the dispersion as a function of wavelength, i.e., the optical transmission of fundamental and second harmonic frequencies is phase matched in the medium. The phase matching can provide a high conversion percentage of the incident light to the second harmonic wave.

For the general case of parametric wave mixing, the phase matching condition is expressed by the relationship:

$$n_1\omega_1 + n_2\omega_2 = n_3\omega_3$$

where $n_1$ and $n_2$ are the indexes of refraction for the incident fundamental radiation, $n_3$ is the index of refraction for the created radiation, $\omega_1$ and $\omega_2$ are the frequencies of the incident fundamental radiation and $\omega_3$ is the frequency of the created radiation. More particularly, for second harmonic generation, wherein $\omega_1$ and $\omega_2$ are the same frequency $\omega$, and $\omega_3$ is the created second harmonic frequency $2\omega$, the phase matching condition is expressed by the relationship:

$$n_\omega = n_{2\omega}$$

where $n_\omega$ and $n_{2\omega}$ are indexes of refraction for the incident fundamental and created second harmonic light waves, respectively. More detailed theoretical aspects are described in "Quantum Electronics" by a. Yariv, chapters 16–17 (Wiley and Sons, New York, 1975).

A present invention isotropic acrylic copolymer medium typically has excellent optical transparency and exhibits hyperpolarization tensor properties such as second harmonic and third harmonic generation, and the linear electrooptic (Pockels) effect. For second harmonic generation, the bulk phase of the acrylic polymer medium whether liquid or solid does not possess a real or orientational average inversion center. The substrate is a macroscopic noncentrosymmetric structure.

Harmonic generation measurements relative to quartz can be performed to establish the value of second order and third order nonlinear susceptibility of the optically clear substrates.

In the case of macroscopic nonlinear optical media that are composed of noncentrosymmetric sites on the molecular and domain level, the macroscopic second order nonlinear optical response $\chi^{(2)}$ is comprised of the corresponding molecular nonlinear optical response $\beta$. In the rigid lattice gas approximation, the macroscopic susceptibility $\omega^{(2)}$ is expressed by the following relationship:

$$\chi_{ijk}(-\omega_3; \omega_1,\omega_2) = Nf^{\omega_3}f^{\omega_2}f^{\omega_1} <\beta_{ijk}(-\omega_3;\omega_1, \omega_2)>$$

wherein N is the number of sites per unit volume, f represent small local field correlations, $\beta_{ijk}$ is averaged over the unit cell, $\omega_3$ is the frequency of the created optical wave, and $\omega_1$ and $\omega_2$ are the frequencies of the incident fundamental optical waves.

A nonlinear optical medium with a centrosymmetric configuration of a polymer molecules as defined herein can exhibit third order nonlinear optical susceptibility $\chi^{(3)}$ of at least about $1 \times 10^{-10}$ esu as measured at 1.91 $\mu$m excitation wavelength.

A nonlinear optical medium with an external field-induced noncentrosymmetric configuration of polymer molecules as defined herein can exhibit second order nonlinear optical susceptibility $\chi^{(2)}$ of at least about $5 \times 10^{-8}$ esu as measured at 1.91 $\mu$m excitation wavelength.

These theoretical considerations are elaborated by Garito et al in chapter 1 of the ACS Symposium Series 233 (1983); and by Lipscomb et al in J. Chem., Phys., 75, 1509 (1981), incorporated by reference. See also Lalama et al, Phys. Rev., A20, 1179 (1979); and Garito et al, Mol., Cryst. and Liq. Cryst., 106, 219 (1984); incorporated by reference.

EXTERNAL FIELD-INDUCED SIDE CHAIN ORIENTATION

The term "external field" as employed herein refers to an electric, magnetic or mechanical stress field which is applied to a medium of mobile organic molecules, to induce dipolar alignment of the molecules parallel to the field.

The nonlinear optically responsive side chains of a present invention acrylic copolymer may be aligned by the application of an external field to a mobile matrix of the acrylic copolymer molecules. Application of a DC electric field produces orientation by torque due to the interaction of the applied electric field and the net molecular dipole moment of the polymer side chains. The molecular dipole moment is due to both the permanent dipole moment (i.e., the separation of fixed positive and negative charge) and the induced dipole moment (i.e., the separation of positive and negative charge by the applied field).

Application of an AC electric field also can induce bulk alignment. In this case, orienting torque occurs solely due to the interaction of the applied AC field and the induced dipole moment. Typically, AC field strengths exceeding 1 kV/cm at a frequency exceeding 1 KHz are employed.

Application of a magnetic field also can effect alignment. Organic molecules do not possess a permanent magnetic dipole moment. In a manner analogous to AC electric field, a magnetic field can induce a net magnetic dipole moment. Torque results from the interaction of the induced dipole moment and the external magnetic field. Magnetic field strengths exceeding 10 Kgauss are sufficient to induce alignment of mobile acrylic copolymer side chains.

Mechanical stress induced molecular alignment is applicable to side chain acrylic copolymers. Specific mechanical stress methods include stretching a thin film, or coating an acrylic copolymer surface with an aligning polymer such as nylon. Physical methods (e.g., stretching) rely upon the rigid and geometrically asymmetric character of the acrylic copolymer molecules to induce bulk orientation. Chemical methods (e.g., coating the surface with an aligning polymer) rely upon strong intermolecular interactions to induce surface orientation.

Application of an AC electric, magnetic or mechanical external field produces colinear molecular alignment in which the molecular direction (either parallel or antiparallel to the orientation axis) is statistically random, and the resultant molecularly oriented medium exhibits third order nonlinear optical susceptibility $\chi^{(3)}$. Application of a DC electric external field produces colinear molecular alignment in which the molecular direction is not random, and is characterized by a net parallel alignment of molecular dipoles. The resultant molecularly oriented medium exhibits second order nonlinear optical susceptibility $\omega^{(2)}$.

The orientation of the isotropic acrylic copolymer side chain is accomplished when the polymer molecules are in a mobile phase, e.g., the copolymer is at a temperature near or above the copolymer glass transition temperature. The aligned phase of the mobile molecules can be frozen by cooling the medium below the glass transition temperature while the aligned phase is still under the influence of the applied external field.

The following examples are further illustrative of the present invention. The components and specific ingredients are presented as being typical, and various modifications can be derived in view of the foregoing disclosure within the scope of the invention.

EXAMPLE I

This Example illustrates the preparation of an isotropic 50/50 copolymer of 4-[N-(2-methacroyloxyethyl)-N-methylamino]-4'-nitrostilbene and butyl methacrylate in accordance with the present invention.

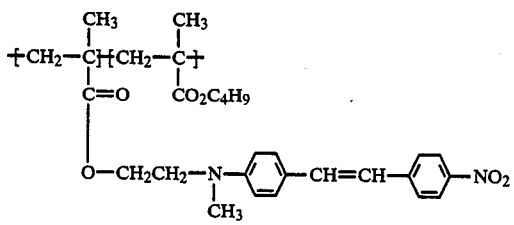

A.
4-[N-(2-Hydroxyethyl)-N-methylamino]benzaldehyde

A 2 liter three necked flask fitted with a mechanical stirrer, thermometer and condenser is charged with 134 g of 2-(methylamino)ethanol, 74.4 g of 4-fluorobenzaldehyde, 1 ml of Aliquat 336, 750 ml of dimethylsulfoxide and 82.8 g of anhydrous potassium carbonate. The mixture is heated at 95° C. for three days. The product mixture is cooled and poured into 8 liters of ice water. The resultant solid precipitate is filtered, washed with water, and vacuum dried. The crude product is recrystallized from toluene, m.p. 72° C.

B.
4-[N-(2-Hyroxyethyl)-N-methylamino]-4'-nitrostilbene

A one liter three necked flask fitted with a dropping funnel, mechanical stirrer and condenser is charged with 34.35 g of 4-nitrophenylacetic acid, and piperidine (16.2 g) is added dropwise over a period of 30 minutes. At the end of the addition, a 33.62 g quantity of 4-[N-(2-hydroxyethyl)-N-methylamino]benzaldehyde is added.

The mixture is heated at 100° C. for three hours, and at 130° C. for three hours. After cooling, the resultant semi-solid mass is ground in ethanol in a blender. The particulate solid is filtered, washed, and vacuum dried. The crude product is recrystallized from chlorobenzene, m.p. 185°–187° C.

C.
4-[N-(2-methacroyloxyethyl)-N-methylamino]-4'-nitrostilbene

A 1 liter three necked flask fitted with a thermometer, condenser, dropping funnel with argon inlet and magnetic stirrer is charged with 5 g of 4-[N-(2-hydroxyethyl)-N-methylamino]-4'-nitrostilbene, 5 g of triethylamine and 400 ml of dichloromethane. The mixture is heated to 35° C., and 3.5 g of methacroyl chloride is added dropwise over a 30 minute period. After stirring at 35° C. for 4 hours, another 3.5 g of methacroyl chloride is added and the reaction medium is stirred for about 20 hours at 35° C. The product mixture is extracted three times with distilled water. The organic phase is dried over magnesium sulfate, and the solvent is evaporated. The resultant crude product is vacuum dried and then recrystallized from acetonitrile, m.p. 142°–148° C.

D. 50/50 Isotropic Acrylic Copolymer

4-[N-(2-Methacroyloxymethyl)-N-methylamino]-4'-nitrostilbene (2 g) is suspended in 20 ml of chlorobenzene in a reactor, and the mixture is degassed one hour. To the suspension are added 0.776 g of butyl methacrylate (7.76 ml of a 10% solution in chlorobenzene) and one mole percent of azobisisobutyronitrile.

The reactor is capped and placed in a 75° C. oil bath for a period of about 18 hours. The product mixture then is poured into methanol to precipitate the copolymer. The solid copolymer is recovered by filtration, and vacuum dried.

The copolymer has a weight average molecular weight in the range of 60,000–80,000, and exhibits a $T_g$ of 92° C.

EXAMPLE II

This Example illustrates the preparation of isotropic acrylic copolymers and terpolymers in accordance with the present invention.

The procedure of Example I are followed, employing selected combinations of monomers.

A 25/75 copolymer of 4-[N-(2-methacroyloxyethyl)-N-methylamino]-4'-nitrostilbene and butyl methacrylate has a weight average molecular weight in the range of 60,000–80,000, and exhibits a $T_g$ of 71° C.

A 25/75 copolymer of 4-[N-(2-methacroyloxyethyl)-N-methylamino]-4'-nitrostilbene and methyl methacrylate has a weight average molecular weight in the range of 60,000–80,000, and exhibits a $T_g$ of 120° C.

Utilizing the Example I procedures, the following copolymers and terpolymers are prepared:

(50/50) 4-[N-[3-(2-chloro)acroyloxypropyl]amino]-4'-cyanostilbene/methyl acrylate (90/10) 4-[N-[8-(2-phenyl)acroyloxyoctyl]-N-ethylamino]-4'-nitrostilbene/methyl methacrylate (30/70) 4-[N-[2-(2-trifluoromethyl)acroyloxyethyl]-N-methylamino]-4'-nitrostilbene/hexyl acrylate (50/50) [1-(2-methacroyloxyethyl)-N-methylamino]-4'-nitrostilbene/methyl 2-(4-methylphenyl)acrylate (75/125/125) 4-[N-(4-(4-acroyloxybutyl)-N-butylamino]-4'-nitrostilbene/methyl acrylate/styrene The prepared polymers have a combination of physical and optical properties which are similar to those of the isotropic acrylic copolymer described in Example I.

EXAMPLE III

This Example illustrates a poling procedure for producing a transparent film of an isotropic side chain acrylic copolymer which exhibits second order nonlinear optical response in accordance with the present invention.

A. Poling Cell Construction

A poling cell is constructed from electrically conductive glass plates, such as Corning Glass EC-2301. The glass plates are washed with sulfuric acid, isopropanol, 1-dodecanol, and isopropanol, with a distilled water rinse between each washing step.

The poling cell is a sandwich type cell in which the conductive glass surfaces are in facing proximity and are separated by a polyimide film of approximately 25 micrometer thickness. A thin layer of epoxy adhesive is applied on the surfaces of the polyimide film to hold the glass plates.

After the epoxy is completely cured, the cell is washed with isopropanol and rinsed with distilled water. After drying, the cell is stored in a dry box.

B. Filling The Poling Cell

The 50/50 acrylic copolymer of Example I is placed in a vacuum oven and maintained in a melt phase at a temperature of about 100° C. for about 2 hours to eliminate entrained air bubbles from the polymer melt.

The acrylic copolymer melt is introduced into the space between the glass plates by charging a drop of the polymer melt to one of the openings of the poling cell space and placing the cell assembly in a vacuum oven maintained at a temperature of approximately 120° C. The cell space fills gradually by capillary action. The space filling period is about 2 hours for a 0.5 cm long space.

C. Electric Field-Induced Orientation

Two lead wires are attached to each of the conductive glass surfaces using electrically conductive epoxy adhesive. The poling assembly is placed in a microscope hot stage (Mettler FP-82 with FP-80 Central Processor), and the sample is observed with a polarizing microscope (Leitz Ortholux Pol) for alignment.

The microscope is switched into a photodiode (Mettler Photometer No. 17517) to record the change of light intensity upon application of an electric field. The two lead wires are connected to an AC voltage amplifier (Electro-Optic Developments LA10A), which amplifies the voltage signal from a signal generator (Hewlett-Packard No. 3310B).

The poling cell first is heated to 100° C. to bring the acrylic copolymer to the melt phase. The AC voltage source is set at 500 V, and the frequency is set at 2000 Hz. The power to the poling cell is turned on to apply an electric field across the copolymer sample. The field strength is calculated to be approximately $2 \times 10^5$ V/cm. About three seconds after the electric field is applied, the photodiode signal drops close to the baseline, indicating that orientation development induced by the electric field is completed. At this point, the cell is cooled to room temperature, and the poling assembly is disconnected from the power source.

When the poling assembly is removed from the microscope hot stage, by visual observation the acrylic copolymer in the cell space is transparent. This is an indication that the molecular orientation is uniform and homogeneous throughout the sample. The copolymer molecules possess no net alignment of molecular dipoles along the electric field even though the molecular axis is oriented along the field axis. Antiparallel packing of molecular dipoles produces a center of inversion symmetry so that the materials exhibit third order nonlinear optical susceptibility $\chi^{(3)}$.

D. High Field Poling For Symmetry Control

The oriented isotropic acrylic copolymer sample is subjected to a higher electric field to develop a noncentrosymmetric orientation of nonlinear optical moieties which are a part of the side chains of the copolymer.

The poling cell assembly is heated to 85° C., which is approximately 7° C. below the glass transition temperature of the copolymer. Then the lead wires of the poling assembly are connected to a DC voltage source (Kepco OPS-3500) and the voltage is turned up until it reaches 2000 V. At this point, the electric field strength across the sample is about $8 \times 10^5$ V/cm. The sample is maintained at this field strength level for a period of about two seconds or longer as necessary to achieve the molecular alignment, and then the voltage source is disconnected. A noncentrosymmetrically oriented acrylic copolymer matrix is obtained when the cell sample is cooled.

The $\chi^{(2)}$ value for the acrylic copolymer is $56 \times 10^{-9}$ esu as measured at 1.91 μm excitation wavelength. A comparative $\chi^{(2)}$ value for potassium dihydrogen phosphate is $2.4 \times 10^{-9}$ esu.

What is claimed is:

1. An isotropic acrylic copolymer which is characterized by recurring monomeric units corresponding to the formula:

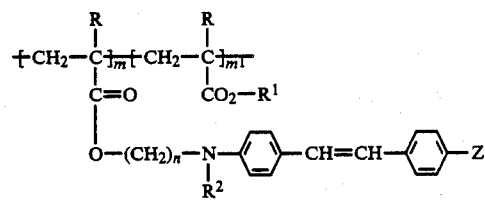

where m and $m^1$ are integers which total at least 10, and the m monomer comprises between about 10–90 mole percent of the total $m+m^1$ monomer units; R is hydrogen or $C_1$–$C_4$ alkyl, $C_6$–$C_{10}$ aryl, halo or haloalkyl substituent; n is an integer between about 1–12; $R^1$ is a $C_1$–$C_6$ alkyl substituent; $R^2$ is hydrogen or a $C_1$–$C_4$ alkyl substituent; and Z is a nitro or cyano substituent.

2. An acrylic copolymer in accordance with claim 1 which has a weight average molecular weight in the range between about 5000–200,000.

3. An acrylic copolymer in accordance with claim 1 which has a glass transition temperature in the range between about 40°–150° C.

4. A transparent nonlinear optical medium comprising a copolymer in accordance with claim 1.

5. A transparent nonlinear optical medium in accordance with claim 4 which is characterized by an external field-induced orientation of aligned m monomer side chains.

6. An isotropic acrylic copolymer which is characterized by recurring monomeric units corresponding to the formula:

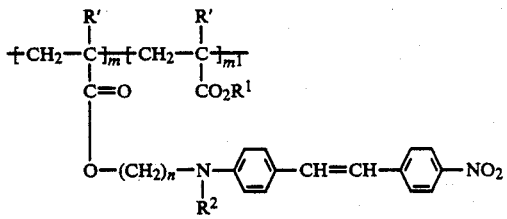

where m and $m^1$ are integers which total at least 20, and the m monomer comprises between about 20–80 mole percent of the total m+m¹ monomer units; R' is hydrogen or a methyl substituent; n is an integer between about 1–12; $R^1$ is a $C_1$–$C_6$ alkyl substituent; and $R^2$ is hydrogen or a $C_1$–$C_4$ alkyl substituent.

7. A transparent nonlinear optical medium comprising an acrylic copolymer in accordance with claim 6.

8. A transparent nonlinear optical medium in accordance with claim 7 which is characterized by an external field-induced orientation of aligned m monomer side chains.

9. An isotropic acrylic copolymer which is characterized by recurring monomeric units corresponding to the formula:

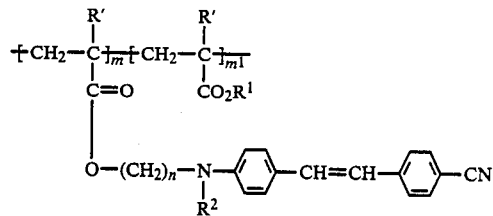

where m and $m^1$ are integers which total at least 20, and the m monomer comprises between about 20–80 mole percent of the total m+m¹ monomer units; R' is hydrogen or a methyl substituent; n is an integer between about 1–12; $R^1$ is a $C_1$–$C_6$ alkyl substituent; and $R^2$ is hydrogen or a $C_1$–$C_4$ alkyl substituent.

10. A transparent nonlinear optical medium comprising an acrylic copolymer in accordance with claim 9.

11. A transparent nonlinear optical medium in accordance with claim 10 which is characterized by an external field-induced orientation of aligned m monomer side chains.

* * * * *